US011884230B1

(12) United States Patent
Faruque et al.

(10) Patent No.: US 11,884,230 B1
(45) Date of Patent: Jan. 30, 2024

(54) INSTRUMENT PANEL MOUNTED KNEE AIRBAG

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/815,952

(22) Filed: Jul. 29, 2022

(51) Int. Cl.
*B60R 21/206* (2011.01)
*B60R 21/231* (2011.01)
*B60R 21/00* (2006.01)

(52) U.S. Cl.
CPC .......... *B60R 21/206* (2013.01); *B60R 21/231* (2013.01); *B60R 2021/0051* (2013.01); *B60R 2021/23169* (2013.01)

(58) Field of Classification Search
CPC ................ B60R 21/206; B60R 21/231; B60R 2021/0051; B60R 2021/23169
See application file for complete search history.

(56) References Cited

U.S. PATENT DOCUMENTS

| 7,384,065 | B2 | 6/2008 | Takimoto et al. |
| 10,562,482 | B2 | 2/2020 | Zhao et al. |
| 2010/0109365 | A1* | 5/2010 | Shibata ................. B60R 21/206 280/728.3 |
| 2019/0232912 | A1* | 8/2019 | Campbell ............. B60R 21/235 |
| 2019/0256036 | A1* | 8/2019 | Zhao ..................... B60R 21/206 |
| 2020/0276953 | A1* | 9/2020 | Enders ................. B60R 21/206 |
| 2021/0229616 | A1* | 7/2021 | Shrivatri ............. B60R 21/2338 |

FOREIGN PATENT DOCUMENTS

| CN | 111497777 A | 8/2020 |
| JP | 5155592 B2 | 3/2013 |

* cited by examiner

*Primary Examiner* — Paul N Dickson
*Assistant Examiner* — Matthew Joseph Ganci
(74) *Attorney, Agent, or Firm* — Erank A. MacKenzie; Bejin Bieneman PLC

(57) ABSTRACT

An instrument-panel assembly for a vehicle includes an instrument panel. The instrument-panel assembly includes a steering column adjacent to the instrument panel. The instrument-panel assembly includes an airbag mounted to the instrument panel below the steering column. The airbag is inflatable to an inflated position below the steering column. The airbag defines a knee cavity in the inflated position. The airbag in the inflated position has a knee-forward panel vehicle-forward of the knee cavity; a first wing and a second wing that extends vehicle-rearward from the knee-forward panel on opposite sides of the knee cavity; and a top panel that extends vehicle-rearward from the knee-forward panel and extends from the first wing to the second wing above the knee cavity.

18 Claims, 6 Drawing Sheets

INSTRUMENT PANEL MOUNTED KNEE AIRBAG

BACKGROUND

Vehicles are equipped with airbags. In the event of certain impacts, an inflator activates and provides inflation medium to the airbags, and the airbags pressurize and act as supplemental restraints for occupants during the impact. The airbags are located at various fixed positions in passenger compartments of vehicles. Vehicles may include airbags supported on an instrument panel, side air curtains mounted to the roof rails, side airbags mounted to seats, etc.

DETAILED DESCRIPTION

Figure 1:
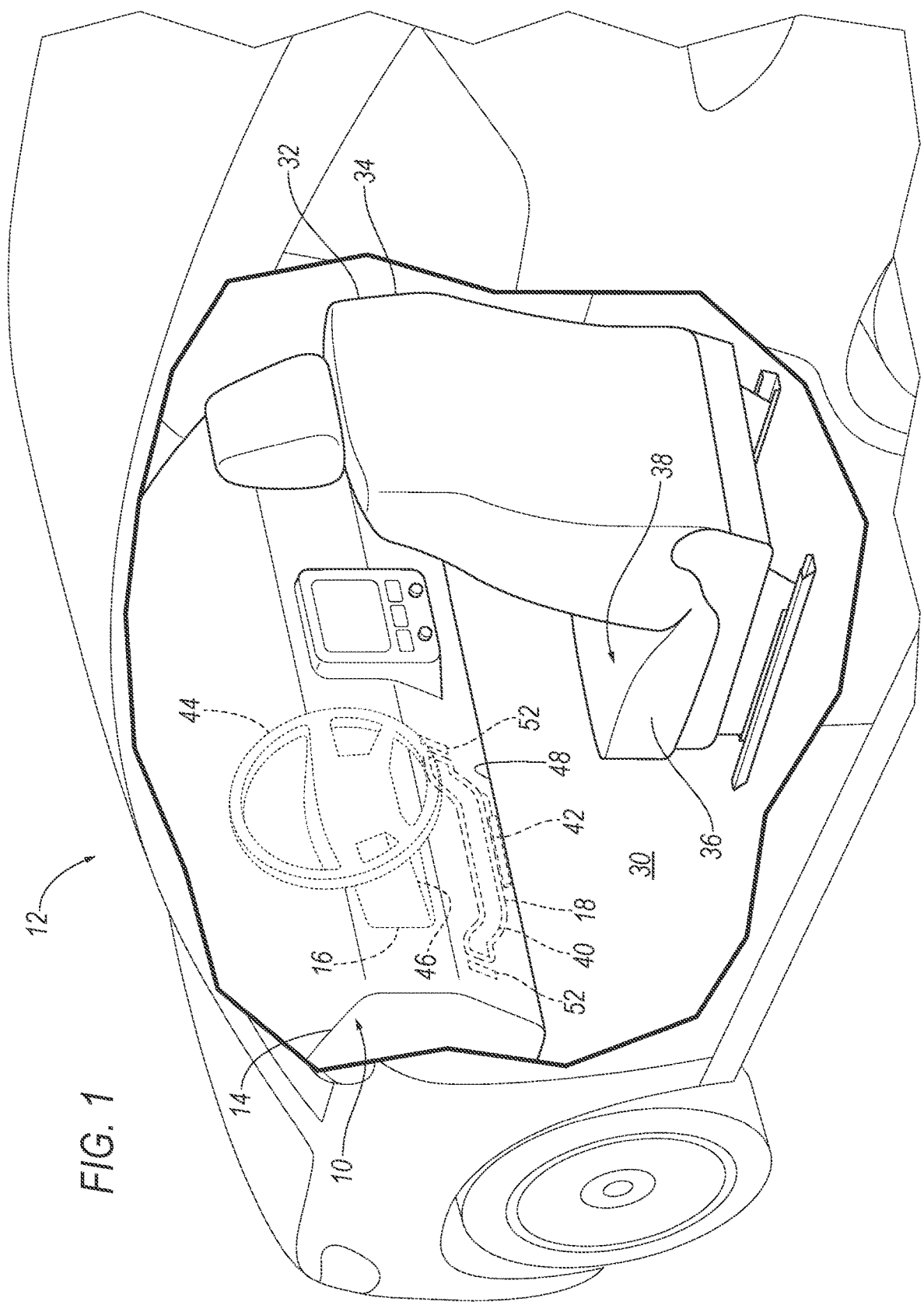
FIG. 1 is a perspective view of a vehicle including an airbag assembly in an uninflated position shown in hidden lines.

An instrument-panel assembly includes an instrument panel and a steering column adjacent the instrument panel. An airbag is mounted to the instrument panel below the steering column. The airbag is inflatable to an inflated position below the steering column. The airbag defines a knee cavity in the inflated position. The airbag in the inflated position has a knee-forward panel vehicle-forward of the knee cavity, a first wing and a second wing extending vehicle-rearward from the knee-forward panel on opposite sides of the knee cavity, and a top panel extending vehicle-rearward from the knee-forward panel and extending from the first wing to the second wing above the knee cavity.

The instrument-panel assembly may include a seat and the airbag may be between the instrument panel and the seat in the inflated position.

The instrument-panel assembly may include a seat having a seat bottom between the first wing and the second wing in the inflated position. The knee-forward panel may be between the instrument panel and the seat bottom in the inflated position. The top panel may be between the steering column and the seat in the inflated position. The top panel may extend from the knee-forward panel toward the seat. The first wing, the second wing, and the top panel may curve from the knee-forward panel toward the seat.

The first wing and the second wing may extend vehicle rearward from the top panel.

The instrument-panel assembly may include a seat having a seat bottom, and the knee-forward panel may be between the instrument panel and the seat bottom in the inflated position.

The instrument-panel assembly may include a seat having a seat bottom, and the knee cavity may be between the steering column and the seat bottom.

The instrument-panel assembly may include a floor, and the airbag in the inflated position may be between the steering column and the floor.

The airbag defines an inflation chamber extending along each of the knee-forward panel, the first wing, the second wing, and the top panel in the inflated position.

The instrument-panel assembly may include an airbag deflector fixed to the instrument panel, and the airbag deflector may be aimed vehicle rearward.

The airbag in the uninflated position may be elongated in a cross-vehicle direction.

The instrument-panel assembly may include a knee bolster supported by the instrument panel below the steering column, and the airbag may be between the instrument panel and the knee bolster in the uninflated position.

The knee cavity may be designed to receive knees of an occupant seated vehicle-rearward of the airbag in the inflated position.

With reference to the Figures, wherein like numerals indicate like parts throughout the several views, an instrument-panel assembly 10 for a vehicle 12 includes an instrument panel 14. The instrument-panel assembly 10 includes a steering column 16 adjacent to the instrument panel 14. The instrument-panel assembly 10 includes an airbag 18 mounted to the instrument panel 14 below the steering column 16. The airbag 18 is inflatable to an inflated position below the steering column 16. The airbag 18 defines a knee cavity 20 in the inflated position. The airbag 18 in the inflated position has a knee-forward panel 22 that is vehicle-forward of the knee cavity 20, a first wing 24 and a second wing 26 that extend vehicle-rearward from the knee-forward panel 22 on opposite sides of the knee cavity 20, and a top panel 28 that extends vehicle-rearward from the knee-forward panel 22 and extends from the first wing 24 to the second wing 26 above the knee cavity 20.

The airbag 18 in the inflated position may control the kinematics of an occupant, in particular the knees and/or pelvis of the occupant, during vehicle impact. The knee-forward panel 22 and the top panel 28 may control the kinematics along a vehicle-longitudinal axis, and the first wing 24 and the second wing 26 portion may control the kinematics along a cross-vehicle axis. Specifically, the knee cavity 20 of the airbag 18 receives the knees of the occupant to control the kinematics of a knee and/or pelvis of the occupant in several impact directions, e.g., a frontal impact, an oblique impact, and/or a side impact. In an uninflated position of the airbag 18, the mounting of the airbag 18 to the instrument panel 14 below the steering column 16 alleviates packaging constraints and accommodates the operation of the airbag 18 to control the kinematics of an occupant.

Figure 2:
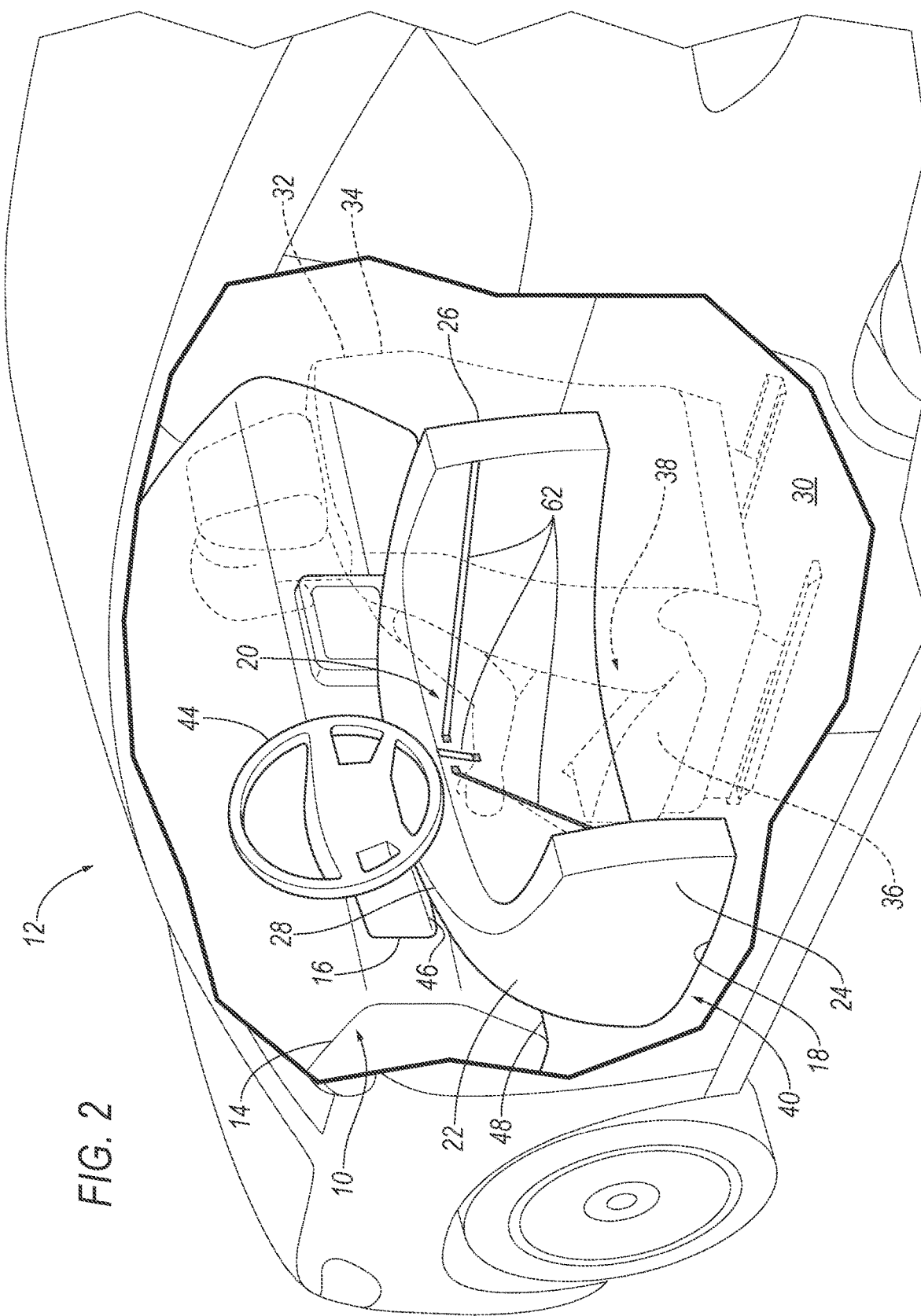
FIG. 2 is a perspective view of the vehicle with the airbag assembly in an inflated position.

With reference to the FIGS. 1-2, the vehicle 12 includes a vehicle body (not numbered) including pillars, body panels (including a roof, a floor 30 etc.) etc. The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle body may include vertical body-mounted pillars. For example, the vehicle body may include pillars on each side of the vehicle 12. Pillars may extend between a windshield (not numbered) and front doors, i.e., at the front end of the passenger compartment. The Additional vertical body-mounted pillars may extend behind the front doors, e.g., between front and rear doors. The vehicle 12 may include additional pillars. The pillars may extend from the roof to the floor 30.

The vehicle body includes the floor 30 and may include the roof. The roof may define the upper boundary of the passenger compartment and may extend from the front end of the passenger compartment to the rear end of the passenger compartment. The floor 30 is below from the roof. The floor 30 may define the lower boundary of the passenger compartment and may extend from the front end of the passenger compartment to the rear end of the passenger compartment.

Figure 3:
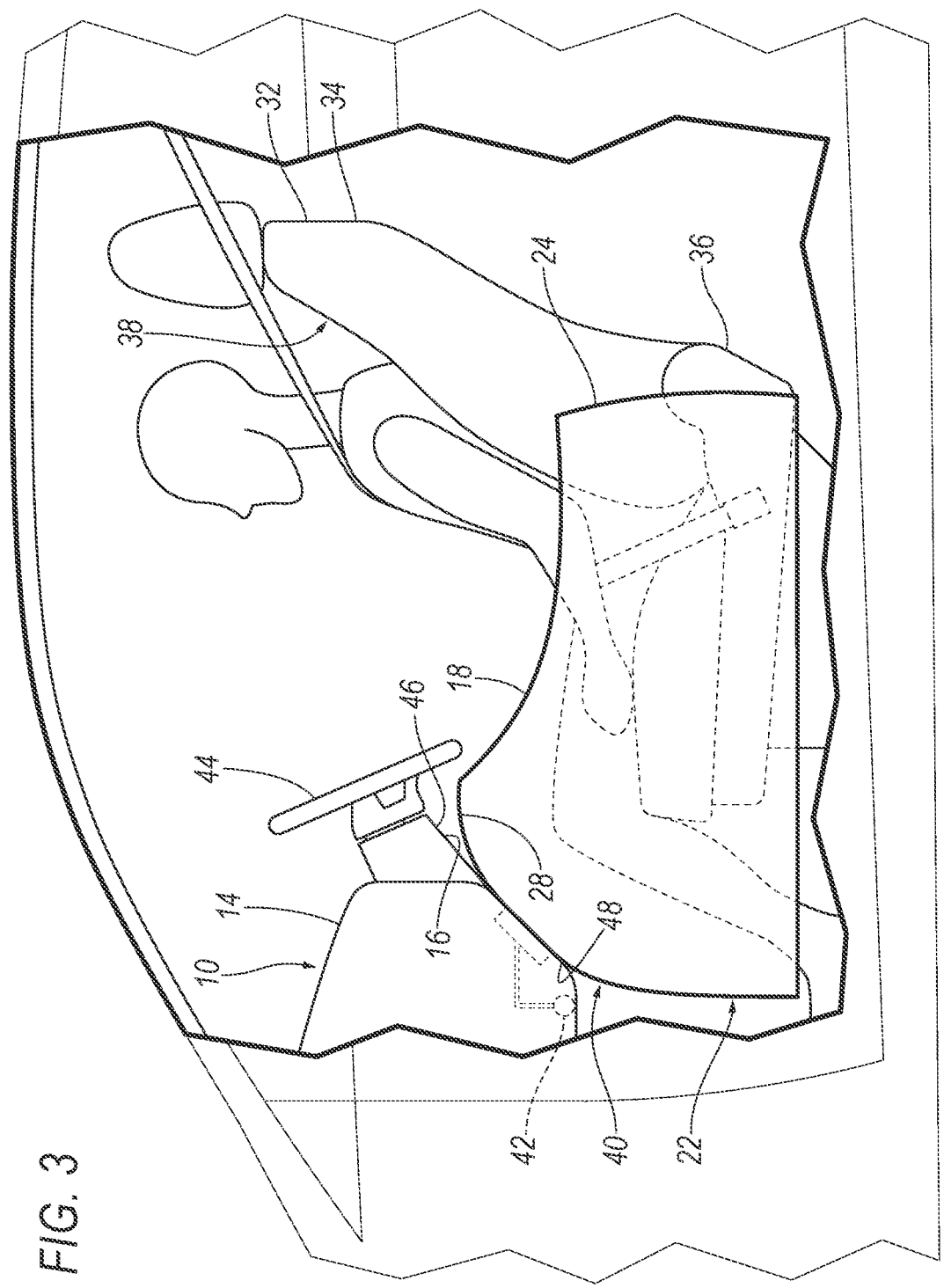
FIG. 3 is a side view of the vehicle with the airbag assembly in the inflated position.
Figure 4:
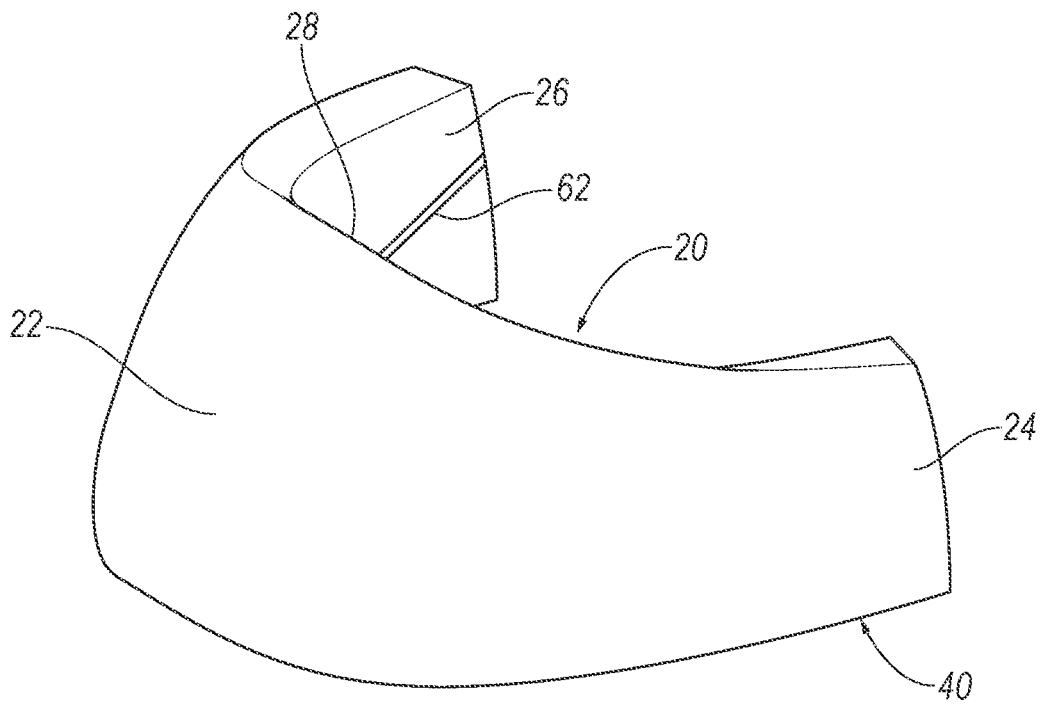
FIG. 4 is a perspective view of the airbag assembly in the inflated position.
Figure 5:
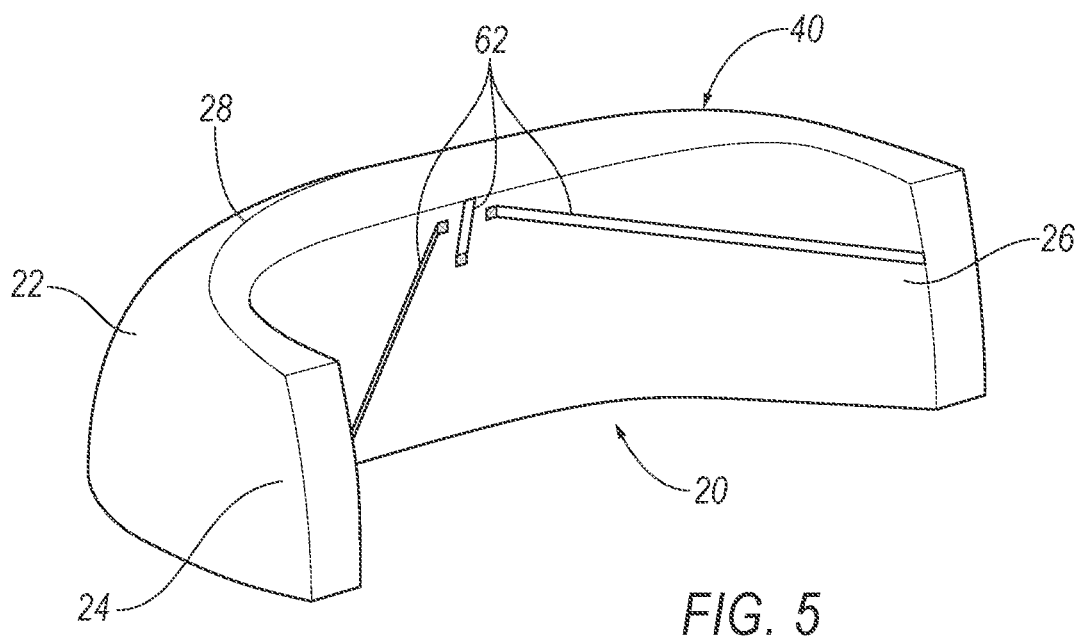
FIG. 5 is another perspective view of the airbag assembly in the inflated position.

With reference to the FIGS. 1-3, the vehicle 12 may include one or more seats 32 including at least a driver seat 32. Specifically, the vehicle 12 may include any suitable number of seats 32. The seats 32 are supported by the floor 30. The seats 32 may be arranged in any suitable arrangement in the passenger compartment. As in the example shown in the Figures, one or more of the seats 32 may be at the front end of the passenger compartment, e.g., a driver seat 32 and/or a passenger seat 32. In other examples, one or more of the seats 32 may be behind the front end of the passenger compartment, e.g., at the rear end of the passenger compartment. The seats 32 may be movable relative to the floor 30 to various positions, e.g., movable fore-and-aft. The seats 32 may be of any suitable type, e.g., a bucket seat.

The seat 32 includes a seatback 34 and a seat bottom 36. The seatback 34 may be supported by the seat bottom 36 and may be stationary or movable relative to the seat bottom 36. The seatback 34 and the seat bottom 36 may be adjustable in multiple degrees of freedom. Specifically, the seatback 34 and the seat bottom 36 may themselves be adjustable. In other words, adjustable components within the seatback 34 and/or the seat bottom 36, and/or may be adjustable relative to each other.

The seat 32 defines an occupant-seating area 38. The occupant-seating area 38 is the space occupied by an occupant properly seated on the seat 32. The occupant-seating area 38 is seat-forward of the seatback 34 and above a top surface of the seat bottom 36. The airbag 18 extends from the instrument panel 14 toward the occupant-seating area 38 to control occupant kinematics.

The vehicle 12 includes a middle console (not numbered). The middle console may be supported by the floor 30. Specifically, in such examples, the middle console extends upwardly from the floor 30 between two seats 32. In such an example, the middle console abuts the floor 30 and may be connected to the floor 30, e.g., with fasteners such as threaded fasteners. The middle console may include cup holders and may support vehicle controls, e.g., a gear shifter, window controls, HVAC controls, multimedia controls, etc.

With continued reference to the FIGS. 1-3, the instrument-panel assembly 10 is at the front end of the passenger compartment. The instrument-panel assembly 10 is vehicle-forward of the seats 32, specifically the driver seat 32. The instrument-panel assembly 10 may extend across the front end of the passenger compartment from one side of the vehicle 12 to the other side of the vehicle 12. Specifically, the instrument-panel assembly 10 is vehicle-forward of the driver seat 32 and may extend across the front end of the passenger compartment vehicle-forward of all of the seats 32 of the vehicle 12.

The instrument-panel assembly 10 includes the instrument panel 14 and an airbag assembly 40 including the airbag 18. The instrument panel 14 may include vehicle controls, such as gauges, dials, screens, and information displays; heating and ventilation equipment; a radio and other electronics; etc. The instrument panel 14 is disposed at a forward end of the passenger compartment and faces toward the seat 32. For example, the instrument panel 14 may extend from one body pillar to another body pillar at the front end of the passenger compartment. The instrument panel 14 may extend downwardly from the windshield (not shown). For example, the instrument panel 14 may extend from the windshield toward the floor 30 of the vehicle 12. The instrument panel 14 may also be called a dash or a bulkhead.

The instrument panel 14 is vehicle-forward of the seats 32, specifically the driver seat 32. The instrument-panel assembly 10 may extend across the front end of the passenger compartment from one side of the vehicle 12 to the other side of the vehicle 12. Specifically, the instrument panel 14 is vehicle-forward of the driver seat 32 and may extend across the front end of the passenger compartment vehicle-forward of all of the seats 32 of the vehicle 12. The instrument panel 14 may, for example, include a class-A surface, i.e., a surface specifically manufactured to have a high quality, finished aesthetic appearance free from blemishes. The class-A surface faces the seats 32.

The instrument panel 14 may be a structural member of the vehicle body, i.e., a portion of the vehicle body resists static and dynamic forces from operation of the vehicle 12 without undue deflection or distortion. Examples of forces include a weight of other vehicle components, passengers, and cargo; twisting forces caused by driving over uneven surfaces; torque from a transmission; longitudinal and lateral forces from driving; and forces from vehicle impact.

The vehicle 12 includes a steering system. The steering system controls the turning of vehicle wheels on a driving surface. The steering system is in communication with and receives input from a steering wheel 44 and/or the computer. The steering system may include a rack-and-pinion system with electric power-assisted steering or a steer-by-wire system, as are both known in the art, or any other suitable system.

With continued reference to the FIGS. 1-3, the vehicle 12, and more specifically the instrument-panel assembly 10, includes the steering column 16. The steering column 16 is adjacent the instrument panel 14 and may be supported by and/or connected to the instrument panel 14. The steering wheel 44 allows an operator to steer the vehicle 12 e.g., by transmitting rotation of the steering wheel 44 to movement of two or more wheels of the vehicle 12. The steering system controls the turning of the wheels of the vehicle 12 based on input from the steering wheel 44.

The steering column 16 may include one or more steering shafts connecting the steering wheel 44 to the steering system. In the example where the steering column 16 includes more than one steering shaft, a universal joint may connect the shafts.

The steering column 16 may include a shroud 46 between the steering wheel 44 and the instrument panel 14. The shroud 46 may be hollow and support and/or receive components including a base of the steering wheel 44, turn signal lever, windshield wiper controls, etc. In examples including the steering shafts, the shroud 46 may cover the steering shafts. The shroud 46 may include a class-A surface facing the passenger compartment, i.e., a surface specifically manufactured to have a high quality, finished aesthetic appearance free from blemishes.

The instrument-panel assembly 10 may include a knee bolster 48. In such examples, the knee bolster 48 is between the instrument panel 14 and the occupant-seating area 38 of the seat 32, specifically the driver seat 32. The knee bolster 48 is below the steering column 16. A portion of the knee bolster 48 may extend upwardly and cross-vehicle along one or both sides of the steering column 16. The knee bolster 48 may be supported by the instrument panel 14. The knee bolster 48 may cover an opening in the instrument panel 14 below the steering column 16 after assembly of the steering column 16 and the instrument panel 14. Specifically, the knee bolster 48 may be directly connected to the instrument panel 14, e.g., with clips, fasteners, etc. The knee bolster 48 may pad impact between the instrument panel 14 and knees of the occupant including during ingress and egress of the occupant. The knee bolster 48 may have a class-A surface that matches the class-A surface of the instrument panel 14.

With continued reference to the FIGS. 1-3, the airbag assembly 40 includes the airbag 18 and an inflator 42. In some examples, the airbag assembly 40 may include a housing (not shown). The airbag assembly 40, and specifically at least the airbag 18, is mounted to the instrument panel 14 below the steering column 16. In the uninflated position, the airbag 18 may be rolled and/or folded on the instrument panel 14, as shown in the example in FIG. 1. In the uninflated position, the airbag 18 may be elongated in the cross-vehicle direction below the steering column 16. In such an example, the airbag 18 may extend around the steering column 16, e.g., may extend upward along sides of the steering column 16 cross-vehicle of the steering column 16. The airbag 18 being below the steering column 16 alleviates packaging constraints and accommodates the operation of the airbag 18.

The airbag 18 may be between the instrument panel 14 and the knee bolster 48 in the uninflated position, as shown in the example in the Figures. Specifically, the airbag 18 in the uninflated position is vehicle-rearward of the instrument panel 14 and vehicle-forward of the knee bolster 48. In such an example, the airbag 18 may disconnect the knee bolster 48 from the instrument panel 14 and/or may break a tear seam of the instrument panel 14 to deploy from the uninflated position to the inflated position.

As set forth above, the airbag assembly 40 is mounted to the instrument panel 14. The airbag 18 may be directly or indirectly mounted to the instrument panel 14. For example, as set forth above, the airbag 18 may be rolled and/or folded on the instrument panel and, in such examples, the airbag 18 may be mounted directly to the instrument panel 14, e.g., with fasteners such as threaded fasteners, push-pins, clips, Christmas-tree fasteners, etc. As another example, the airbag assembly 40 include the housing supported by the instrument panel 14. The housing may be connected to the instrument panel 14, for example, with fasteners such as threaded fasteners, push-pins, clips, Christmas-tree fasteners, etc. The housing houses the airbag 18 in the uninflated position and supports the airbag 18 in the inflated position. The airbag 18 may be rolled and/or folded to fit within the housing in the uninflated position. The housing may be of any suitable material, e.g., a rigid polymer, a metal, a composite, or a combination of rigid materials.

With reference to the FIGS. 1-5, as set forth above, the airbag 18 in the inflated position has the knee-forward panel 22, the first wing 24, the second wing 26, and the top panel 28. The knee-forward panel 22, the first wing 24, the second wing 26, and/or the top panel 28 may be separate components, e.g., discrete sheets of fabric, that are connected together, e.g., by stitching, ultrasonic welding, etc. As another example, the knee-forward panel 22, the first wing 24, the second wing 26, and the top panel 28 may be unitary, i.e., a single, uniform piece of material with no seams, joints, fasteners, or adhesives parts together. For example, the knee-forward panel 22, the first wing 24, the second wing 26, and the top panel 28 may be formed together simultaneously as a single continuous unit by a one-piece woven process.

The airbag 18, including the knee-forward panel 22, the first wing 24, the second wing 26, and the top panel 28, may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 6:
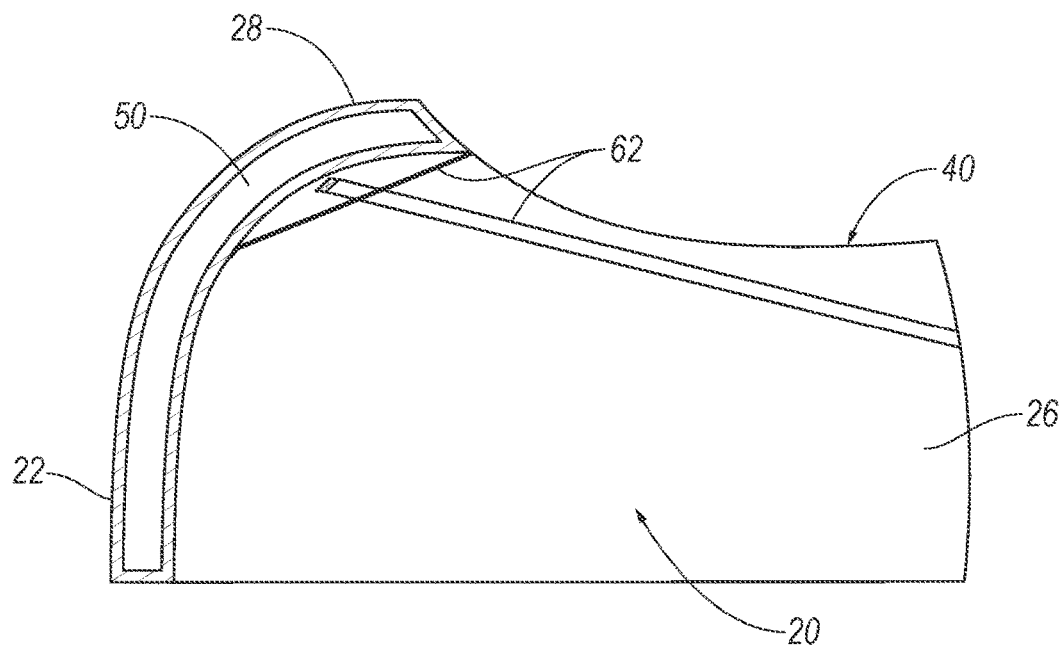
FIG. 6 is a cross-sectional view of an airbag of the airbag assembly in the inflated position.
Figure 7:
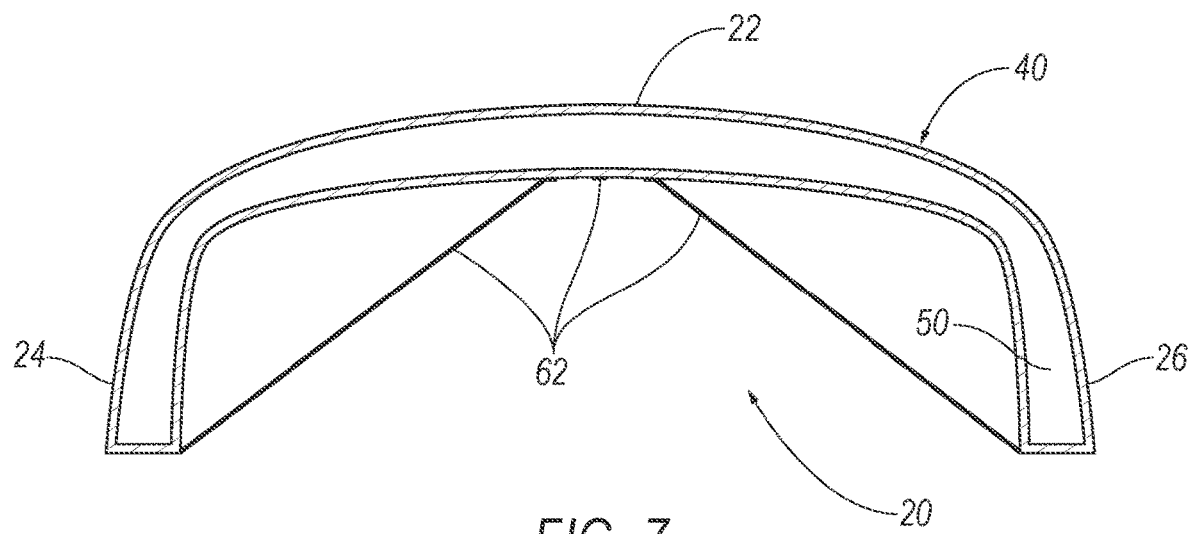
FIG. 7 is another cross-sectional view of the airbag in the inflated position.

With reference to FIGS. 6 and 7, the airbag 18 defines an inflation chamber 50 that is inflatable to the inflated position by the inflator 42, as described further below. The inflation chamber 50 may be continuous, i.e., all parts of the inflation chamber 50 are in fluid communication with each other for communication of inflation medium throughout the inflation chamber 50 for inflation to the inflated position. The airbag 18 may include baffles, internal tethers, internal vents, etc., for control of inflation characteristics and shape of the airbag 18 to the inflated position. The inflation chamber 50 expands in the inflated position, i.e., the inflation chamber 50 is between at least two sheets, e.g., fabric sheets of the airbag 18, that are expanded away from each other as the inflation chamber 50 is filled with inflation medium.

The inflation chamber 50 may extend along each of the knee-forward panel 22, the first wing 24, the second wing 26, and the top panel 28 in the inflated position. In other words, each of the knee-forward panel 22, the first wing 24, the second wing 26, and the top panel 28 is inflated in the inflated position, and specifically includes at least two sheets, e.g., fabric sheets of the airbag 18, with the inflation chamber 50 extending therebetween for inflation by inflation medium in the inflated position.

With reference to FIGS. 1-3, the airbag 18 is inflatable from the instrument panel 14 vehicle-rearward between the instrument panel 14 and the seat 32 from the uninflated position to the inflated position. The airbag 18 is below the steering column 16 in the uninflated position and in the inflated position. The airbag 18 may be inflatable in the event of a vehicle impact, as described below, to control the kinematics of the occupant of the seat 32. As set forth above, in examples in which the airbag 18 is mounted to the instrument panel 14 and is disposed between the instrument panel 14 and the knee bolster 48, the airbag 18 may deploys vehicle-rearward from the knee bolster 48, e.g., by disconnecting the knee bolster 48 from the instrument panel 14 and/or breaking a tear seam of the knee airbag 18.

The airbag 18 in the inflated position is between the steering column 16 and the floor 30. The airbag 18 in the inflated position may extend from below the steering column 16 toward the floor 30. Specifically at least a portion of the top panel 28 may be below the steering column 16, and may abut the steering column 16 as shown in the example in the Figures, and the knee-forward panel 22 extends down from the top panel 28 toward the floor 30, e.g., to a vertical location lower than the top surface of the seat bottom 36 as shown in the example in the Figures. In some examples, the airbag 18 may abut the steering column 16 and/or the floor 30 in the inflated position. In the example shown in the Figures, the airbag 18 in the inflated position abuts the instrument panel 14 and the steering column 16 and extends from the steering column 16 toward the floor 30 and is spaced from the floor 30. In the example shown in the Figure, the airbag 18 extends to and partially along the seat bottom 36. Specifically, the airbag 18 extends from the steering column 16 to an end below the seat bottom 36.

With continued reference to the FIGS. 1-3, the airbag 18 defines the knee cavity 20 in the inflated position. The knee cavity 20 is above the seat bottom 36. Specifically, the knee cavity 20 may be between the steering column 16 and the seat bottom 36. In the inflated position, the knee cavity 20 is open to the seat bottom 36. In the example shown in FIGS. 2 and 3, the knee cavity 20 extends from below the top surface of the seat bottom 36 to above the seat bottom 36.

The knee cavity 20 is designed to, in the inflated position, receive knees of an occupant seated on the seat 32 vehicle-rearward of the airbag 18. Specifically, the knee cavity 20 may be defined by the top panel 28, the knee-forward panel 22, the first wing 24, and the second wing 26. The knee cavity 20 receives the knees of the occupant to control the kinematics of a knee and/or pelvis of the occupant during a vehicle impact. Since the knee cavity 20 receives the knees and the top panel 28, first wing 24, and second wing 26 extend along the legs and knees of the occupant, the airbag 18 controls the kinematics of the occupant in several vehicle impact modes including frontal impact, oblique impact, and/or a side impact. Specifically, since the knee cavity 20 receives the knees and the top panel 28 is positioned above the knees, the knee-forward panel 22 is positioned vehicle-forward of the knees, and the wings are positioned outboard of the knees, the airbag 18 is positioned to control the kinematics of the occupant in various directions of movement of the occupant.

The first wing 24, the second wing 26, and the top panel 28 curve from the knee-forward panel 22 toward the seat bottom 36. Specifically, the first wing 24, the second wing 26, and the top panel 28 curve from the knee-forward panel 22 along the knee cavity 20. In such examples, the knee cavity 20 is arcuate in wrapping around the knees of the occupant of the seat 32.

Specifically, the airbag 18 may include an impact surface along the knee cavity 20. The impact surface is positioned to be impacted by knees and/or legs of the occupant when received by the knee cavity 20. The impact surface may be a unitary sheet of material across the knee-forward panel 22, the top panel 28, the first wing 24, and the second wing 26. The impact surface may extend along the inflation chamber 50 in each of the knee-forward panel 22, the top panel 28, the first wing 24, and the second wing 26. The impact surface may be uninterrupted along the knee-forward panel 22, the top panel 28, the first wing 24, and the second wing 26.

The airbag assembly 40 may include one or more external tethers (not shown). The external tethers restrain movement of parts of the airbag 18 to control the shape and position of the airbag 18 in the inflated position. For example, the external tethers create the curve of the first wing 24, the second wing 26, and the top panel 28 and/or maintain the position of the first wing 24, the second wing 26, and the top panel 28 relative to each other and/or the seat 32 in the inflated position. The external tethers, for example, may extend from the knee-forward panel 22 to the first wing 24 and the second wing 26, as shown in the example in the Figures. In other examples, one or more external tethers may extend between any two or combinations of the knee-forward panel 22, first wing 24, second wing 26, and top panel 28. The tethers may be fixed to the airbag 18 by, for example, stitching, adhesive, etc. The tethers may be fabric and may of the same type of material as the airbag 18.

As set forth above, the airbag 18 is between the instrument panel 14 and the seat 32 in the inflated position. Specifically, the airbag 18 defines the knee cavity 20 between the instrument panel 14 and the seat bottom 36 in the inflated position. The knee cavity 20 may extend across the seat bottom 36 i.e., cross-seat 32 from one side to the other side of the seat bottom 36.

With reference to the FIGS. 1-5, the knee-forward panel 22 is vehicle-forward of the knee cavity 20. The knee-forward panel 22 controls the kinematics of the knees of the occupant during forward movement of the knees during a vehicle impact that urges the occupant vehicle-forward, e.g., during a frontal impact.

With reference to the FIGS. 1-3, the knee-forward panel 22 is between the instrument panel 14 and the seat bottom 36 in the inflated position. As an example, the knee-forward panel 22 is between the instrument panel 14 and the seat bottom 36 along a horizontal line between the instrument panel 14 and the seat bottom 36. The knee-forward panel 22 abuts the instrument panel 14 and the instrument panel 14 acts as a reaction surface for at least the knee-forward panel 22. The knee-forward panel 22 may abut the steering column 16 in the inflated position, as shown in the example shown in the Figures.

The knee-forward panel 22 is supported by the instrument panel 14. In other words, the weight of the knee-forward panel 22 is borne by the instrument panel 14. As an example, the knee-forward panel 22 may be mounted directly to the instrument panel 14, as described above, in the uninflated and inflated positions. In such an example, the airbag 18 may be supported on the instrument panel 14 by the knee-forward panel 22. In that example, the weight of the top panel 28, the first wing 24, and the second wing 26 may be borne by the knee-forward panel 22 and the weight of the knee-forward panel 22 may be borne by the instrument panel 14.

With continued reference to the FIGS. 1-5, the top panel 28 extends vehicle-rearward from the knee-forward panel 22. The knee-forward panel 22 is generally upright and the top panel 28 is generally prone. For example, the knee-forward panel 22 generally extends at an angle between 45 degrees and 90 degrees relative to horizontal and the top panel 28 generally extends from the knee-forward panel 22 at an angle between 0 and 45 degrees relative to horizontal. The airbag 18 may curve from the knee-forward panel 22 to the top panel 28. The impact surface may be uninterrupted from the knee-forward panel 22 to the top panel 28 and may curve from the knee-forward panel 22 to the top panel 28.

The top panel 28 is above the knee cavity 20 in the inflated position to control the kinematics of the knees of the occupant during a vehicle impact. For example, the top panel 28 is between the steering column 16 and the knee cavity 20 to control the kinematics of the knees during vehicle impacts that urge the knees toward the steering column 16. The top panel 28 may be between the steering column 16 and the seat bottom 36 in the inflated position.

The top panel 28 extends from the first wing 24 to the second wing 26 above the knee cavity 20. The first wing 24 and the second wing 26 extend vehicle rearward from the top panel 28. In other words, the first wing 24 and second wing 26 may extend further in the vehicle rearward direction than the top panel 28.

The first wing 24 and the second wing 26 extend vehicle-rearward from the knee-forward panel 22 on opposite sides of the knee cavity 20. The seat bottom 36 is between the first wing 24 and the second wing 26 in the inflated position.

Specifically, one of the wings is between a vehicle door (not shown) and the occupant-seating area 38 and the other of the wings is between the middle console and the occupant-seating area 38. The wings control the kinematics of the occupant, e.g., legs of the occupant, during vehicle impacts that urge the occupant cross-vehicle.

The airbag 18 may curve from the knee-forward panel 22 to first wing 24 and the second wing 26 and may curve from the top panel 28 to the first wing 24 and the second wing 26. The impact surface may be uninterrupted from the knee-forward panel 22 to the first wing 24 and the second wing 26 and from the top panel 28 to the first wing 24. The impact surface may curve from the knee-forward panel 22 to the first wing 24 and the second wing 26 and may curve from the top panel 28 to the first wing 24 and the second wing 26.

The instrument-panel assembly 10 may include one or more airbag deflectors 52. The airbag deflector 52 is aimed vehicle rearward to direct movement of the airbag 18 from the instrument panel 14 vehicle rearward to position the knee-forward panel 22, the top panel 28, the first wing 24, and the second wing 26 in the inflated position. The airbag 18 is rigid relative to the airbag 18 to direct movement of the airbag 18 as the airbag 18 inflates. The airbag deflector 52 may be, for example, plastic. The airbag deflector 52 is fixed to the instrument panel 14. For example, the airbag deflector 52 may be unitary with the inflator 42 or fixed to the instrument panel 14 with fasteners, welding, adhesive, etc. The airbag deflector 52 may be between the instrument panel 14 and the knee bolster 48 when the airbag 18 is in the uninflated position.

In the example shown in the Figures, the instrument-panel assembly 10 includes two airbag deflectors 52 spaced cross vehicle with the airbag 18 disposed therebetween in the uninflated position. The airbag deflectors 52 direct movement of the first wing 24 and the second wing 26, respectively, during inflation of the airbag 18.

The inflator 42 is supported by the instrument panel 14, i.e., may be directly connected to the instrument panel 14 or supported by the housing in examples including the housing, and the inflator 42 is fluidly connected to the airbag 18. The inflator 42 expands the airbag 18 with inflation medium, such as a gas, to move the airbag 18 from the uninflated position to the inflated position. The inflator 42 may be, for example, a pyrotechnic inflator 42 that ignites a chemical reaction to generate the inflation medium, a stored gas inflator 42 that releases (e.g., by a pyrotechnic valve) stored gas as the inflation medium, or a hybrid. The inflator 42 may be supported by any suitable component. For example, the inflator 42 may be supported by the housing. The inflator 42 may be, for example, at least partially in the inflation chamber 50 of the airbag 18 to deliver inflation medium directly to the inflation chamber 50 or may be connected to the inflation chamber 50 through fill tubes, diffusers, etc.

Figure 8:
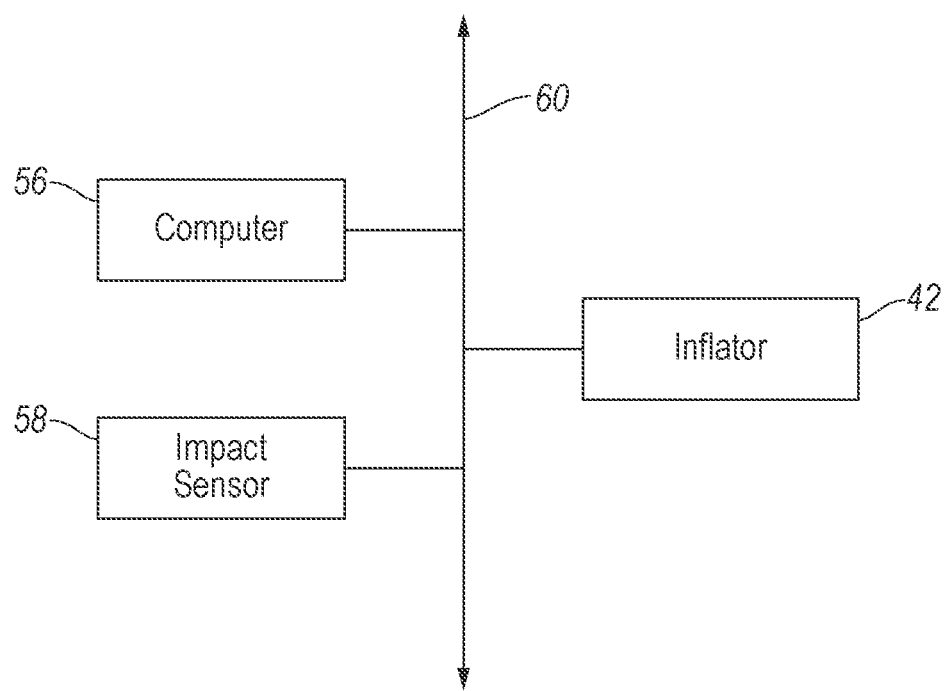
FIG. 8 is a block diagram of a system of the vehicle.

With reference to FIG. 8, The vehicle 12 includes a computer 56 that controls the inflator 42. The computer 56 may be, for example, a restraints control module. The vehicle 12 computer 56 includes a processor and a memory. The memory includes one or more forms of computer readable media, and stores instructions executable by the vehicle computer 56 for performing various operations, including as disclosed herein. For example, a vehicle computer 56 can be a generic computer 56 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, a vehicle computer 56 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the computer 56. The memory can be of any type, e.g., hard disk drives, solid state drives, servers, or any volatile or non-volatile media. The memory can store the collected data sent from the sensors. The memory can be a separate device from the computer 56, and the computer 56 can retrieve information stored by the memory via a network in the vehicle 12, e.g., over a CAN bus, a wireless network, etc. Alternatively or additionally, the memory can be part of the computer 56, e.g., as a memory of the computer 56. The computer 56 may include programming to operate one or more of vehicle brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer 56, as opposed to a human operator, is to control such operations. Additionally, the computer 56 may be programmed to determine whether and when a human operator is to control such operations. The computer 56 may include or be communicatively coupled to, e.g., via a communications network 60 such as a communications bus as described further below, more than one processor, e.g., included in components such as sensors, electronic control units (ECUs) or the like included in the vehicle 12. The computer 56 is generally arranged for communications on a vehicle communication network that can include a bus in the vehicle 12 such as a controller area network CAN or the like, and/or other wired and/or wireless mechanisms. Alternatively or additionally, in cases where the computer 56 actually comprises a plurality of devices, the vehicle communication network may be used for communications between devices represented as the computer 56 in this disclosure. Further, as mentioned below, various controllers and/or sensors may provide data to the computer 56 via the vehicle communication network.

The vehicle 12 may include at least one impact sensor 58 for sensing impact of the vehicle 12. The impact sensor 58 is in communication with the computer 56. The computer 56 may activate the inflator 42, e.g., provide an impulse to a pyrotechnic charge of the inflator 42 when the impact sensor 58 senses an impact of the vehicle 12. Alternatively or additionally to sensing impact, the impact sensor 58 may be configured to sense impact prior to impact, i.e., pre-impact sensing. The impact sensor 58 is configured to detect an impact to the vehicle 12. The impact sensor 58 may be of any suitable type, for example, post-contact sensors such as accelerometers, pressure sensors, and contact switches; and pre-impact sensors 58 such as radar, LIDAR, and vision-sensing systems. The vision-sensing systems may include one or more cameras, CCD image sensors, CMOS image sensors, etc. The impact sensor 58 may be located at numerous points in or on the vehicle 12.

The vehicle 12 includes a communication network 60 that can include a bus in the vehicle 12 such as a controller area network (CAN) or the like, and/or other wired and/or wireless mechanisms. Via the vehicle 12 network, the computer 56 may transmit messages to various devices in the vehicle 12 and/or receive messages (e.g., CAN messages) from the various devices, e.g., sensors, an actuator, a human machine interface (HMI), etc. Alternatively or additionally, in cases where the computer 56 actually comprises a plurality of devices, the vehicle communication network 60 may be used for communications between devices represented as the computer 56 in this disclosure. Further, as mentioned below, various controllers and/or sensors may provide data to the computer 56 via the vehicle communication network 60.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An instrument-panel assembly comprising:
   an instrument panel;
   a steering column adjacent the instrument panel;
   an airbag mounted to the instrument panel below the steering column, the airbag being inflatable to an inflated position below the steering column;
   the airbag defining a knee cavity in the inflated position;
   the airbag in the inflated position having a knee-forward panel vehicle-forward of the knee cavity, a first wing and a second wing extending vehicle-rearward from the knee-forward panel on opposite sides of the knee cavity, and a top panel;
   the top panel extending vehicle-rearward from the knee-forward panel and overlying the knee cavity; and
   the top panel extending from the first wing to the second wing and overlying the knee cavity.

2. The instrument-panel assembly of claim 1, further comprising a seat, the airbag being between the instrument panel and the seat in the inflated position.

3. The instrument-panel assembly of claim 1, further comprising a seat having a seat bottom between the first wing and the second wing in the inflated position.

4. The instrument-panel assembly of claim 3, wherein the knee-forward panel is between the instrument panel and the seat bottom in the inflated position.

5. The instrument-panel assembly of claim 4, wherein the top panel is between the steering column and the seat in the inflated position.

6. The instrument-panel assembly of claim 4, wherein the top panel extends from the knee-forward panel toward the seat.

7. The instrument-panel assembly of claim 3, wherein the first wing, the second wing, and the top panel curve from the knee-forward panel toward the seat.

8. The instrument-panel assembly of claim 1, wherein the first wing and the second wing extend vehicle rearward from the top panel.

9. The instrument-panel assembly of claim 1, further comprising a seat having a seat bottom, the knee-forward panel being between the instrument panel and the seat bottom in the inflated position.

10. The instrument-panel assembly of claim 1, further comprising a seat having a seat bottom, the knee cavity being between the steering column and the seat bottom.

11. The instrument-panel assembly of claim 1, further comprising a floor, wherein the airbag in the inflated position is between the steering column and the floor.

12. The instrument-panel assembly of claim 1, wherein the airbag defines an inflation chamber extending along each of the knee-forward panel, the first wing, the second wing, and the top panel in the inflated position.

13. The instrument-panel assembly of claim 1, further comprising an airbag deflector fixed to the instrument panel, the airbag deflector aimed vehicle rearward.

14. The instrument-panel assembly of claim 1, wherein the airbag in the uninflated position is elongated in a cross-vehicle direction.

15. The instrument-panel assembly of claim 1, further comprising a knee bolster supported by the instrument panel below the steering column, the airbag being between the instrument panel and the knee bolster in the uninflated position.

16. The instrument-panel assembly of claim 1, wherein the knee cavity is designed to receive knees of an occupant seated vehicle-rearward of the airbag in the inflated position.

17. The instrument-panel assembly of claim 12, wherein the knee cavity is vehicle-rearward of the inflation chamber.

18. The instrument-panel assembly of claim 12, further comprising an inflator in fluid communication with the inflation chamber to deliver inflation medium to the inflation chamber, the inflation chamber being inflatable to the inflated position by the inflator.

* * * * *